Patented May 26, 1925.

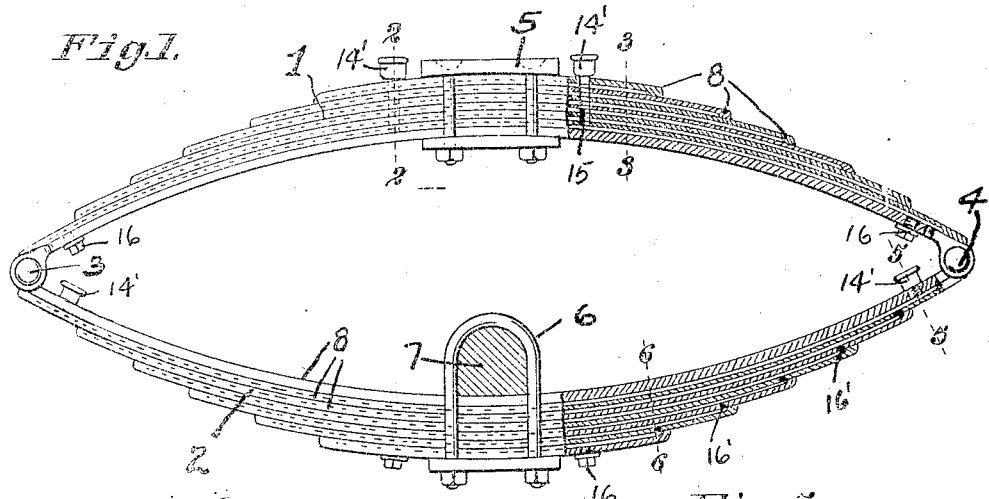

1,539,553

UNITED STATES PATENT OFFICE.

ROBERT BERKELEY FEAR, OF SAN FRANCISCO, CALIFORNIA.

INTERNALLY-LUBRICATED LEAF SPRING.

Application filed October 3, 1922. Serial No. 592,773.

*To all whom it may concern:*

Be it known that I, ROBERT BERKELEY FEAR, a citizen of the United States, and a resident of the city and county of San Francisco, State of California, have made a new and useful invention, to wit, Improvements in Internally Lubricated Leaf Springs; and I do hereby declare the following to be a full, clear, concise, and exact description of the same.

This invention relates particularly to vehicle leaf spring constructed and arranged with an internal lubricating system therein.

An object of the invention is to provide a vehicle leaf spring with lubricant passages between the respective contacting faces of the various spring elements for the purpose of eliminating friction, increasing the efficiency of the spring action and increasing the natural life of the spring material. A further object of the invention is to provide a spring, such as described, that will be superior in point of simplicity and inexpensiveness of construction, facility and convenience in use and general efficiency. Other objects and advantages will appear as this description progresses.

In this specification and the annexed drawings, the invention is illustrated in the form considered to be the best, but it is to be understood that the invention is not to be limited to such form, because it may be embodied in other forms, and it is also to be understood that in and by the claims following the description, it is desired to cover the invention in whatsoever form it may be embodied.

In the accompanying sheet of drawings,

Fig. 1 is a side elevation, partly in section, of a full elliptic spring constructed in accordance with my invention.

Fig. 2 is a cross-section taken through Fig. 1 on the line 2—2.

Fig. 3 is a cross-section taken through Fig. 1 on the line 3—3.

Fig. 4 is a typical plan view of the end of one of leaf spring ends.

Fig. 5 is a cross section taken through Fig. 1 on the line 5—5.
Fig. 6 is a cross section taken through Fig. 1 on the line 6—6.

Fig. 7 is a plan view of the lubricating system of the spring leaves of the lower spring showing the holes connecting the grooves in one leaf to the leaf below.

In detail the construction illustrated in the drawings comprises the upper and lower, elliptic vehicle springs, formed of a plurality of independent leaf members, and respectively denominated 1 and 2. The opposite ends of the respective spring members are joined together in pivotal relationship by the pins 3 and 4. The upper spring 1 is provided with a clamping member 5 enveloping all of the leaf elements intermediate the ends thereof and holding the same in rigid assembly, said element being adapted to be secured to the body of a vehicle or other device. The lower spring 2 is similarly provided with clamp yoke 6 for holding the leaves of said spring relatively immovable relative to the axle 7. Although the springs 1 and 2 are shown joined together in operative relationship it is to be understood as being clearly within the purview of the invention that either one or the other of the said springs might be used separately—and as a single unit—for accomplishing a springing function.

Each of the leaves 8 comprising the upper spring 1 have the lower faces thereof arranged with a plurality of longitudinal grooves or depressions therein. The central longitudinal channel 9 forms the main lubricant supply conduit and is connected by lateral passages 10 to the parallel auxiliary grooves 11 and 12 extending longitudinally adjacent both edges of each spring 8. The grooves 9, 11 and 12 do not extend through the ends of the respective spring leaves but stop adjacent the ends thereof. Lubricant supplied to the central groove 9 would be distributed to the auxiliary channels 11 and 12 and thence distributed between the contacting faces of the spring leaves. In order to prevent escape of the lubricant out through the sides of the leaves a pair of marginal grooves 13 are provided along the edges of each leaf and within which a felt strip 14 or equivalent grease or lubricant retaining means is adapted to be mounted. The felt 14 will thus effectively seal off lubricant losses and also will function as a lubricant reservoir by retaining lubricant to a degree of complete saturation, which said lubricant would be released and distributed as the main source of lubricant supply would become dissipated. The leaves of the spring 1 curve in a downward direction so that by reason of the laminated or stacked construction thereof, oil cups or reservoirs 14' may be mounted on the highest part of the spring and connected by a hole 15 with the grooves 9 in each leaf 8, whereby lubricant would flow by gravity throughout the entire length and breadth of each leaf contacting face. An outlet plug 16 is arranged adjacent the lower ends of the lower leaf of the upper spring 1 communicating with the interior thereof for drawing off excess or waste dirty lubricant.

The leaves 8 of the lower spring are provided with grooves, the same as described in spring 1, on the upper faces thereof. Spring 2 differs from spring 1 in that the oil cups 14' are arranged adjacent the opposite ends of the spring (rather than in the middle of the spring)—the oil flowing by gravity to the low point and thence being distributed through the ports 16' into the oil grooves of the next adjacent spring leaf. In the spring 2 the discharge plugs 16 are positioned substantially intermediate the spring ends.

Fig. 7 shows a modified form of the invention capable of adaptation to a conventional type of spring. In this construction the oil carrying grooves would be arranged on either the upper or lower faces of the spring leaves and suitable connection would be made between the grooves of adjacent leaves by the holes 16'. It should be noticed that the holes 16' register with the grooves of an adjacent leaf away from the ends thereof in order to coincide with the form of groove shown and described in Figs. 1 through 6.

Having thus described this invention what I claim and desire to secure by Letters Patent is:

A spring, comprising, a plurality of stacked leaf members each of which has a lubricant passage along one face thereof and an aperture communicating and registering with the passage of the next adjacent leaf member; a source of lubricant supply connected with said passages; a lubricant retaining means interposed between said passage and the sides of said spring; means to draw off excess lubricant from said passages; and means for holding said stacked leaf members together.

In testimony whereof, I have hereunto set my hand at San Francisco, California, this 16th day of September, 1922.

ROBERT BERKELEY FEAR.